United States Patent
Hori et al.

(10) Patent No.: US 8,801,568 B2
(45) Date of Patent: Aug. 12, 2014

(54) CONTROL APPARATUS AND CONTROL METHOD FOR HYBRID VEHICLE

(71) Applicants: Tetsuo Hori, Toyota (JP); Hiroatsu Endo, Nagoya (JP); Isao Sato, Nagoya (JP); Hiroki Kuwamoto, Toyota (JP); Akihiro Sato, Nagoya (JP); Ryo Watanabe, Toyota (JP)

(72) Inventors: Tetsuo Hori, Toyota (JP); Hiroatsu Endo, Nagoya (JP); Isao Sato, Nagoya (JP); Hiroki Kuwamoto, Toyota (JP); Akihiro Sato, Nagoya (JP); Ryo Watanabe, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/138,234

(22) Filed: Dec. 23, 2013

(65) Prior Publication Data

US 2014/0179488 A1     Jun. 26, 2014

(30) Foreign Application Priority Data

Dec. 25, 2012    (JP) ................................. 2012-281165

(51) Int. Cl.
      *H02P 15/02*           (2006.01)

(52) U.S. Cl.
      USPC .............................................. 477/9; 477/107

(58) Field of Classification Search
      USPC .................... 477/3–5, 7, 9, 92, 107, 182, 203
      See application file for complete search history.

(56) References Cited

U.S. PATENT DOCUMENTS

| | | | | |
|---|---|---|---|---|
| 2011/0300990 A1* | 12/2011 | Swales et al. | | 477/4 |
| 2012/0024652 A1* | 2/2012 | Ishii et al. | | 192/69 |
| 2012/0028757 A1* | 2/2012 | Kimura et al. | | 477/5 |
| 2012/0095635 A1* | 4/2012 | Kanno et al. | | 701/22 |
| 2012/0115677 A1* | 5/2012 | Sakai et al. | | 477/5 |

FOREIGN PATENT DOCUMENTS

JP       2009-222105 A     10/2009

\* cited by examiner

*Primary Examiner* — Justin Holmes
(74) *Attorney, Agent, or Firm* — Gifford, Krass, Sprinkle, Anderson & Citkowski, P.C.

(57) ABSTRACT

Controlling a hybrid vehicle includes: reducing a rotation speed of a motor generator before a locking apparatus that locks the motor generator is switched from a disengaged condition to an engaged condition; starting to switch the locking apparatus to the engaged condition when the rotation speed decreases to a predetermined operation permission rotation speed; controlling the locking apparatus such that from the start of the switch to the engaged condition onward, the rotation speed decreases from the operation permission rotation speed to an engagement rotation speed with the motor generator in the engaged condition; and controlling the locking apparatus such that a decrease rate of the rotation speed when switching from the disengaged condition to the engaged condition in a low torque operation mode is higher than the decrease rate of the rotation speed when switching from the disengaged condition to the engaged condition in a high torque operation mode.

7 Claims, 5 Drawing Sheets

CONTROL APPARATUS AND CONTROL METHOD FOR HYBRID VEHICLE

INCORPORATION BY REFERENCE

The disclosure of Japanese Patent Application No. 2012-281165, filed on Dec. 25, 2012 including the specification, drawings and abstract is incorporated herein by reference in its entirety.

BACKGROUND OF THE INVENTION

1. Field of the Invention

The invention relates to a control apparatus and a control method applied to a hybrid vehicle having an engine and a motor generator as travel power sources.

2. Description of Related Art

In a control apparatus applied to a hybrid vehicle having a lockable motor generator coupled to a power distribution mechanism, the motor generator is locked after synchronizing a motor rotation speed (rotation speed) of the motor generator and a rotation speed of a locking member (see Japanese Patent Application Publication No. 2009-222105 (JP 2009-222105 A), for example).

SUMMARY OF THE INVENTION

Various types of engines have been developed recently to achieve improvements in a fuel efficiency of the engine. Examples thereof include a variable displacement engine in which a part of a plurality of cylinders is rested, and an engine that is capable of executing lean combustion and stoichiometric combustion respectively by switching a target air-fuel ratio. Application of these engines to a hybrid vehicle having a lockable motor generator has not been investigated sufficiently. An output torque output during an operation of these engines varies before and after an operation mode is switched, and therefore, when an operation condition used to lock the motor generator, such as a synchronization rotation speed, for example, is set similarly regardless of the operation mode, problems may arise.

The invention provides a control apparatus and a control method applied to a hybrid vehicle having a lockable motor generator and installed with an engine an output torque of which varies before and after an operation mode is switched.

A first aspect of the invention relates to a control apparatus for a hybrid vehicle. The hybrid vehicle includes: an engine in which a low torque operation mode, in which the engine is operated at a low output torque, and a high torque operation mode, in which the engine is operated at a higher output torque than in the low torque operation mode, are executed; a motor generator; an output portion for transmitting torque to a drive wheel; a differential mechanism that distributes the torque of the engine to the motor generator and the output portion; and a locking apparatus that is switched between an engaged condition, in which the motor generator is prevented from rotating, and a disengaged condition, in which the motor generator is allowed to rotate. The control apparatus includes a controller. The controller is configured to reduce a rotation speed of the motor generator before the locking apparatus is switched from the disengaged condition to the engaged condition. The controller is configured to start switching the locking apparatus to the engaged condition when the rotation speed decreases to a predetermined operation permission rotation speed. The controller is configured to control the locking apparatus such that from the start of the switch to the engaged condition onward, the rotation speed decreases from the operation permission rotation speed to an engagement rotation speed at which the motor generator is in the engaged condition. The controller is configured to control the locking apparatus such that a decrease rate of the rotation speed when switching from the disengaged condition to the engaged condition in the low torque operation mode is higher than the decrease rate of the rotation speed when switching from the disengaged condition to the engaged condition in the high torque operation mode. The decrease rates are obtained by dividing the operation permission rotation speed by a time required for the rotation speed to decrease from the operation permission rotation speed to the engagement rotation speed.

When the motor generator is locked by operating the locking apparatus, torque variation accompanying the locking operation may be transmitted to the output portion via the differential mechanism such that shock is generated in the vehicle. When the locking apparatus is operated, a reaction force to a torque (to be referred to hereafter as an engagement torque capacity) borne by the locking apparatus is transmitted to the output portion. Hence, the shock generated in the vehicle correlates with the engagement torque capacity such that the shock generated in the vehicle increases as the engagement torque capacity increases. Further, a characteristic of the engagement torque capacity is that the engagement torque capacity increases as the decrease rate (rotation speed decrease rate) of the rotation speed of the motor increases and an engine torque increases. In an operation mode where the motor generator is allowed to rotate, the engine is operated at a lower torque in the low torque operation mode than in the high torque operation mode, even when a power of the engine is equal. Therefore, when the decrease rate of the rotation speed during the locking operation is identical in the low torque operation mode and the high torque operation mode, the engagement torque capacity decreases in the low torque operation mode relative to the high torque operation mode in accordance with the reduced engine torque, leading to a reduction in the shock generated in the vehicle.

Here, when control is performed at an identical rotation speed decrease rate in the low torque operation mode and the high torque operation mode in alignment with the high torque operation mode, in which the shock is large, the shock generated in the vehicle can be suppressed in both operation modes. In the low torque operation mode, however, the operation condition on which the locking apparatus is operated becomes unnecessarily loose. In other words, the locking apparatus is operated excessively cautiously at an unnecessarily low rotation speed decrease rate despite the fact that the shock generated in the vehicle would not be affected by slightly increasing the rotation speed decrease rate in the low torque operation mode such that the locking apparatus is controlled under a stricter condition than in the high torque operation mode. As a result, surplus operations must be performed on the motor generator or the locking apparatus, leading to deterioration of the fuel efficiency. Conversely, when control is performed at an identical rotation speed decrease rate in the low torque operation mode and the high torque operation mode in alignment with the low torque operation mode, in which the shock is small, surplus operations are not performed in the low torque operation mode, and therefore deterioration of the fuel efficiency can be suppressed. However, the shock is not suppressed sufficiently in the high torque operation mode, and therefore the driver may experience a sense of discomfort.

With the control apparatus according to the invention, the motor rotation speed of the motor generator is reduced to the predetermined operation permission rotation speed before starting to operate the locking apparatus, and therefore shock generated in the vehicle can be suppressed. Further, the locking apparatus is controlled such that during the process for switching from the disengaged condition to the engaged condition, the rotation speed decrease rate of the motor generator is higher in the low torque operation mode than in the high torque operation mode. As a result, the shock generated in the vehicle can be suppressed in both the low torque operation mode and the high torque operation mode while suppressing deterioration of the fuel efficiency in the low torque operation mode. Hence, with the control apparatus according to the invention, both the shock generated in the vehicle and deterioration of the fuel efficiency can be suppressed. Note that when the rotation speed decrease rate is modified between the high torque operation mode and the low torque operation mode, either one or both of the operation permission rotation speed and the time may be modified.

In the control apparatus described above, the operation permission rotation speed when switching from the disengaged condition to the engaged condition in the low torque operation mode may be set to be higher than the operation permission rotation speed when switching from the disengaged condition to the engaged condition in the high torque operation mode. According to this aspect, the operation of the locking apparatus can be started at a higher motor rotation speed in the low torque operation mode than in the high torque operation mode. In other words, the motor rotation speed can be reduced by a smaller amount in the low torque operation mode than in the high torque operation mode. Hence, according to this aspect, an amount of energy required to reduce the motor rotation speed in the low torque operation mode can be reduced in comparison with a case where the operation permission rotation speed is set to be identical in the high torque operation mode and the low torque operation mode, and as a result, deterioration of the fuel efficiency can be suppressed even more effectively.

In the control apparatus described above, the controller may be configured to control the locking apparatus such that the time required to switch from the disengaged condition to the engaged condition in the high torque operation mode is identical to the time required to switch from the disengaged condition to the engaged condition in the low torque operation mode. In this case, the operation of the locking apparatus is completed in an equal amount of time in the high torque operation mode and the low torque operation mode, and therefore the driver does not experience a sense of discomfort caused by a difference in the operation time.

In the control apparatus described above, the controller may be configured to control the locking apparatus such that the time required to switch from the disengaged condition to the engaged condition in the low torque operation mode is shorter than the time required to switch from the disengaged condition to the engaged condition in the high torque operation mode.

In the control apparatus described above, the controller may be configured to control the engine that includes a plurality of cylinders such that the engine executes a partial cylinder operation, in which a part of the plurality of cylinders is rested while remaining cylinders are operated, as the low torque operation mode and an all-cylinder operation, in which all of the plurality of cylinders are operated, as the high torque operation mode. According to this aspect, the shock generated in the vehicle can be suppressed during both the partial cylinder operation and the all-cylinder operation while suppressing deterioration of the fuel efficiency during the partial cylinder operation, and therefore both the shock generated in the vehicle and deterioration of the fuel efficiency can be suppressed.

In the control apparatus described above, the controller may be configured to switch an operation mode of the engine between stoichiometric combustion and lean combustion, and configured to execute the lean combustion as the low torque operation mode and the stoichiometric combustion as the high torque operation mode. According to this aspect, the shock generated in the vehicle can be suppressed during both the lean combustion and the stoichiometric combustion while suppressing deterioration of the fuel efficiency during the lean combustion, and therefore both the shock generated in the vehicle and deterioration of the fuel efficiency can be suppressed. Note that in this aspect, stoichiometric combustion includes not only combustion having a target air-fuel ratio that precisely matches the stoichiometric air-fuel ratio, but also combustion having a target air-fuel ratio in the vicinity of the stoichiometric air-fuel ratio. Further, lean combustion is combustion having a target air-fuel ratio with a larger value than the target air-fuel ratio of the stoichiometric combustion, or in other words a lean side target air-fuel ratio.

A second aspect of the invention relates to a method of controlling a hybrid vehicle. The hybrid vehicle includes: an engine in which a low torque operation mode, in which the engine is operated at a low output torque, and a high torque operation mode, in which the engine is operated at a higher output torque than in the low torque operation mode, are executed; a motor generator; an output portion for transmitting torque to a drive wheel; a differential mechanism that distributes the torque of the engine to the motor generator and the output portion; and a locking apparatus that is switched between an engaged condition, in which the motor generator is prevented from rotating, and a disengaged condition, in which the motor generator is allowed to rotate. The control method includes: reducing a rotation speed of the motor generator before the locking apparatus is switched from the disengaged condition to the engaged condition; starting to switch the locking apparatus to the engaged condition when the rotation speed decreases to a predetermined operation permission rotation speed; controlling the locking apparatus such that from the start of the switch to the engaged condition onward, the rotation speed decreases from the operation permission rotation speed to an engagement rotation speed at which the motor generator is in the engaged condition; and controlling the locking apparatus such that a decrease rate of the rotation speed when switching from the disengaged condition to the engaged condition in the low torque operation mode is higher than the decrease rate of the rotation speed when switching from the disengaged condition to the engaged condition in the high torque operation mode. The decrease rates are obtained by dividing the operation permission rotation speed by a time required for the rotation speed to decrease from the operation permission rotation speed to the engagement rotation speed.

According to the invention, as described above, the locking apparatus is controlled such that during the process for switching from the disengaged condition to the engaged condition, the decrease rate of the rotation speed of the motor generator is higher in the low torque operation mode than in the high torque operation mode, and as a result, both shock generated in the vehicle and deterioration of the fuel efficiency can be suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Figure 1:
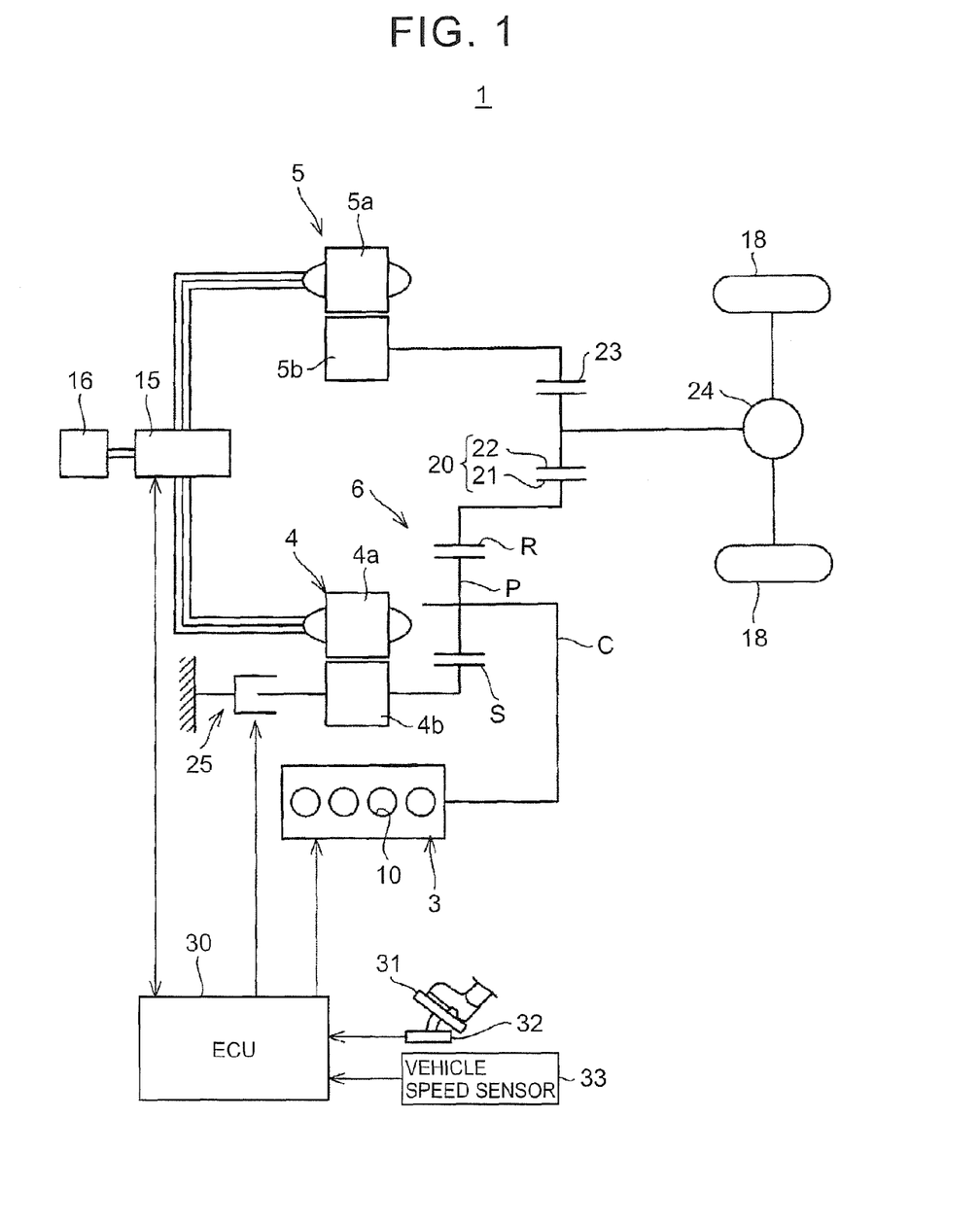
FIG. 1 is a view showing an overall configuration of a vehicle to which a control apparatus according to a first embodiment of the invention is applied.

As shown in FIG. 1, a vehicle 1 is constituted as a hybrid vehicle in which a plurality of power sources are combined. The vehicle 1 includes, as power sources for traveling, an engine 3 and two motor generators 4, 5. The engine 3 is constituted as an inline four-cylinder internal combustion engine having four cylinders 10. The engine 3 is configured to execute an all-cylinder operation, in which all of the four cylinders 10 are operated, and a partial cylinder operation, in which two of the four cylinders 10 are rested and the remaining two cylinders are operated.

The engine 3 and the first motor generator 4 are coupled to a power distribution mechanism 6 serving as a differential mechanism. The first motor generator 4 includes a stator 4a and a rotor 4b. The first motor generator 4 functions as both a power generator that generates power upon reception of power from the engine 3 distributed thereto by the power distribution mechanism 6, and a motor driven by alternating current power. Similarly, the second motor generator 5 includes a stator 5a and a rotor 5b, and functions as both a power generator and a motor. The respective motor generators 4, 5 are connected to a battery 16 via a motor control apparatus 15. The motor control apparatus 15 converts the power generated by the respective motor generators 4, 5 into direct current power to be stored in the battery 16, and converts power from the battery 16 into alternating current power to be supplied to the motor generators 4, 5. The first motor generator 4 may be regarded as a motor generator according to the invention.

The power distribution mechanism 6 is constituted as a single pinion type planetary gear mechanism. The power distribution mechanism 6 includes a sun gear S of an external gear, a ring gear R of an internal gear, which is disposed coaxially with the sun gear S, and a planetary carrier C holding a pinion P that meshes with the gears S, R to be capable of rotating and revolving. An engine torque output by the engine 3 is transmitted to the planetary carrier C of the power distribution mechanism 6. The rotor 4b of the first motor generator 4 is coupled to the sun gear S of the power distribution mechanism 6. Torque output from the power distribution mechanism 6 via the ring gear R is transmitted to an output gear train 20. The output gear train 20 functions as an output portion for transmitting torque to drive wheels 18. The output gear train 20 includes an output drive gear 21 that rotates integrally with the ring gear R of the power distribution mechanism 6, and an output driven gear 22 that meshes with the output drive gear 21. The second motor generator 5 is coupled to the output driven gear 22 via a gear 23. The gear 23 rotates integrally with the rotor 5b of the second motor generator 5. Torque output from the output driven gear 22 is distributed to the left and right drive wheels 18 via a differential apparatus 24.

The power distribution mechanism 6 is provided with a motor locking mechanism 25 serving as locking apparatus. The motor locking mechanism 25 is switched between an engaged condition, in which the first motor generator 4 is prevented from rotating, and a disengaged condition, in which the first motor generator 4 is allowed to rotate. The motor locking mechanism 25 is constituted by a multiplate wet type brake mechanism. The motor locking mechanism 25 is switched between the engaged condition and the disengaged condition by a hydraulic actuator, not shown in the drawing. When the motor locking mechanism 25 is operated to the engaged condition, the rotor 4b of the first motor generator 4 is prevented from rotating. Accordingly, the sun gear S of the power distribution mechanism 6 is also prevented from rotating. As a result, distribution of the torque of the engine 3 to the first motor generator 4 is stopped, whereby the power distribution mechanism 6 enters a non-differential condition.

The respective parts of the vehicle 1 are controlled by an electronic control apparatus (ECU) 30 constituted as a computer. The ECU 30 performs various types of control on the engine 3, the respective motor generators 4, 5, the motor locking mechanism 25, and so on. Main control performed by the ECU 30 in relation to the invention will be described below. Various information relating to the vehicle 1 is input into the ECU 30. For example, rotation speeds and torques of the respective motor generators 4, 5 are input into the ECU 30 via the motor control apparatus 15. Further, an output signal from an accelerator depression amount sensor 32 that outputs a signal corresponding to a depression amount of an accelerator pedal 31 and an output signal from a vehicle speed sensor 33 that outputs a signal corresponding to a vehicle speed of the vehicle 1 are input respectively into the ECU 30. The ECU 30 calculates a required drive torque required by a driver by referring to the output signal from the accelerator depression amount sensor 32 and the output signal from the vehicle speed sensor 33, and controls the vehicle 1 while switching between various modes to obtain an optimal system efficiency relative to the required drive torque. For example, an electric vehicle (EV) mode, in which combustion in the engine 3 is stopped and the second motor generator 5 is driven, is selected in a low load region where a thermal efficiency of the engine 3 decreases. Further, when insufficient torque is obtained using the engine 3 alone, a hybrid mode, in which the second motor generator 5 is used as a travel drive source together with the engine 3, is selected. In this case, the required drive torque is output by a combination of the engine torque of the engine 3 and a motor torque of the second motor generator 5. In other words, when the engine torque is set as Te and the motor torque is set as Tm, a required drive torque Td is defined by Td=Te+Tm.

When the hybrid mode is selected, the ECU 30 switches between a differential operation mode, in which the lock on the first motor generator 4 is disengaged and power is generated by the first motor generator 4 using the power of the engine 3 distributed thereto by the power distribution mechanism 6, and a non-differential operation mode, in which the first motor generator 4 is locked by the motor locking mechanism 25 such that power distribution from the engine 3 to the first motor generator 4 is stopped and the power of the engine 3 is output to the output gear train 20, in accordance with conditions.

Figure 2:
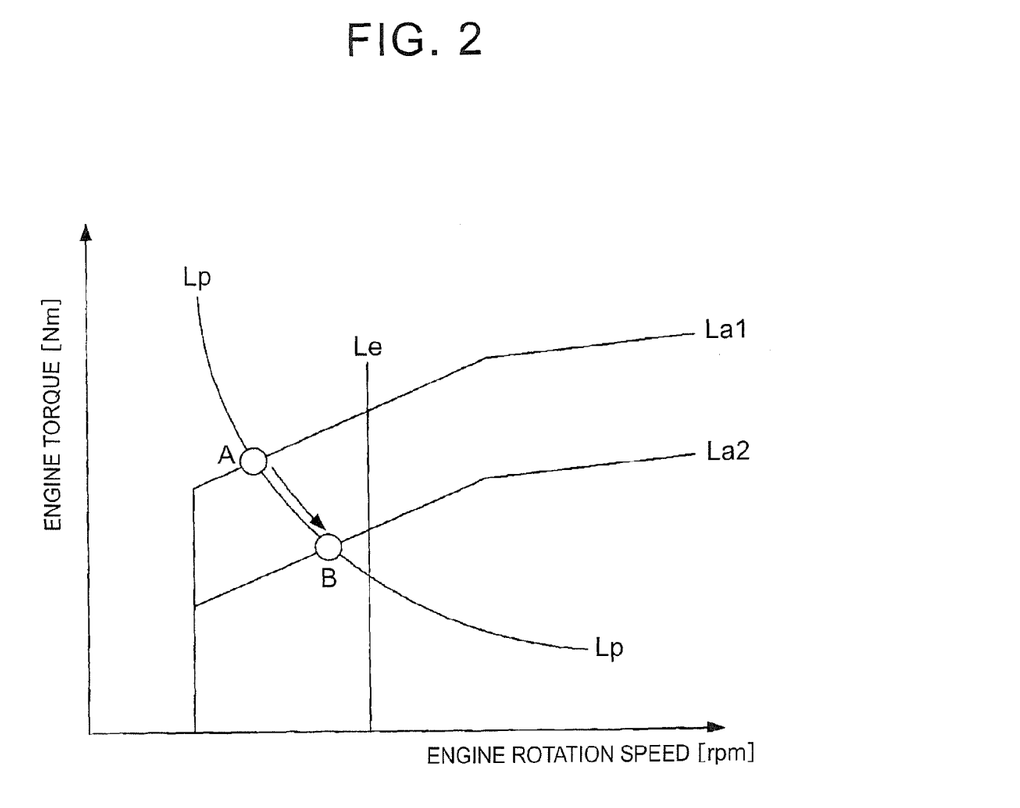
FIG. 2 is a view illustrating an operating point of an engine during an all-cylinder operation and a partial cylinder operation, according to the first embodiment.

As shown in FIG. 2, in the differential operation mode, the engine 3 is controlled by the ECU 30 such that an operating point defined by an engine rotation speed and the engine torque moves along an operating line La1 or an operating line La2, which are set in advance. The operating line La1 is set to correspond to the all-cylinder operation, and the operating line La2 is set to correspond to the partial cylinder operation. Hence, the ECU 30 controls the engine 3 and the first motor generator 4 such that when the all-cylinder operation is performed, the operating point of the engine 3 moves along the operating line La1, and when the partial cylinder operation is performed, the operating point of the engine 3 moves along the operating line La2. As shown in FIG. 2, when the engine 3 is switched from the all-cylinder operation to the partial cylinder operation in the differential operation mode, the ECU 30 moves the operating point along a power line Lp from a point A on the operating line La1 to a point B on the operating line La2 in synchronization with the operation switch. The respective operating lines La1, La2 are determined in advance by performing a simulation or a test using an actual vehicle so that a fuel efficiency of the engine 3 can be optimized and noise can be reduced. As is evident from FIG. 2, the engine 3 is operated further toward a low torque side during the partial cylinder operation than during the all-cylinder operation, even when the power thereof is identical. Hence, the partial cylinder operation and the all-cylinder operation correspond respectively to a low torque operation mode and a high torque operation mode according to the invention.

In the non-differential operation mode, on the other hand, the engine rotation speed and the vehicle speed have a one-on-one relationship. In contrast to the differential operation mode, therefore, the operating point of the engine 3 cannot be controlled on the operating lines La1, La2 without vehicle speed limitations. In other words, in the non-differential operation mode, it is impossible to vary the engine rotation speed while maintaining the vehicle speed, and therefore the operating point of the engine 3 is limited to a straight line Le that is parallel to a vertical axis determined by the vehicle speed. In the non-differential operation mode, in contrast to the differential operation mode, the operating point of the engine 3 is nearly always removed from the operating lines La1, La2 during both the all-cylinder operation and the partial cylinder operation, and therefore the thermal efficiency tends to deteriorate.

The differential operation mode is switched to the non-differential operation mode by locking first motor generator 4 with the aim of preventing a temperature of the first motor generator 4 from exceeding an allowable limit, for example. The differential operation mode may also be switched to the non-differential operation mode for reasons such as avoiding so-called power circulation, in which the rotation of the first motor generator 4 becomes negative in the differential operation mode.

In consideration of the fact that the engine 3 is operated further toward the low torque side during the partial cylinder operation than during the all-cylinder operation, in the first embodiment of the invention, an operation condition on which the motor locking mechanism 25 is operated during a process for switching from the differential operation mode to the non-differential operation mode is modified between the all-cylinder operation and the partial cylinder operation. When the differential operation mode is switched to the non-differential operation mode, the motor locking mechanism 25 is operated from the disengaged condition to the engaged condition. Here, when an inertia of the first motor generator 4 is set as Img, a rotation speed decrease rate (a decrease rate of the rotation speed) of the first motor generator 4 is set as "a", and the engine torque is set as Te, an engagement torque capacity Tb, which is a torque borne by the motor locking mechanism 25, is expressed by Equation 1.

$$Tb = Img \times a + Te \qquad 1$$

When an operation permission rotation speed serving as a rotation speed of the first motor generator at which to start operating the motor locking mechanism 25 is set as Nmgy, and a time required to reach the engaged condition from the start of the operation of the motor locking mechanism 25 is set as $\Delta\theta$, the aforementioned rotation speed decrease rate "a" can be defined by Equation 2. Accordingly, the engagement torque capacity Tb can be expressed by Equation 3.

$$a = Nmgy/\Delta\theta \qquad 2$$

$$Tb = Img \times Nmgy/\Delta\theta + Te \qquad 3$$

When the motor locking mechanism 25 is operated from the disengaged condition to the engaged condition, a reaction force to the engagement torque capacity is transmitted to the output gear train 20. The torque transmitted to the output gear train 20 passes through the differential apparatus 24 to be output from the left and right drive wheels 18. As a result, shock is generated in the vehicle 1 due to variation in the torque transmitted to the output gear train 20. Hence, the shock correlates to the engagement torque capacity Tb, and therefore increases as the engagement torque capacity Tb increases. In the differential operation mode, the engine 3 is operated further toward the low torque side during the partial cylinder operation than during the all-cylinder operation, and therefore, as is evident from Equation 1, when the rotation speed decrease rate "a" generated during the locking operation is identical in the partial cylinder operation and the all-cylinder operation, the engagement torque capacity Tb decreases in the partial cylinder operation relative to the all-cylinder operation in accordance with the reduced engine torque Te, leading to a reduction in the shock generated in the vehicle.

Hence, in the first embodiment, the ECU 30 controls the first motor generator 4 and the motor locking mechanism 25 such that the engagement torque capacity Tb of the motor locking mechanism 25 is equal in the all-cylinder operation and the partial cylinder operation. More specifically, the operation permission rotation speed Nmgy is set to be higher in the partial cylinder operation than in the all-cylinder operation, while the time $\Delta\theta$ is set to be equal in the all-cylinder operation and the partial cylinder operation. As a result, the rotation speed decrease rate "a" defined by Equation 2 is higher in the partial cylinder operation than in the all-cylinder operation.

Figure 3:
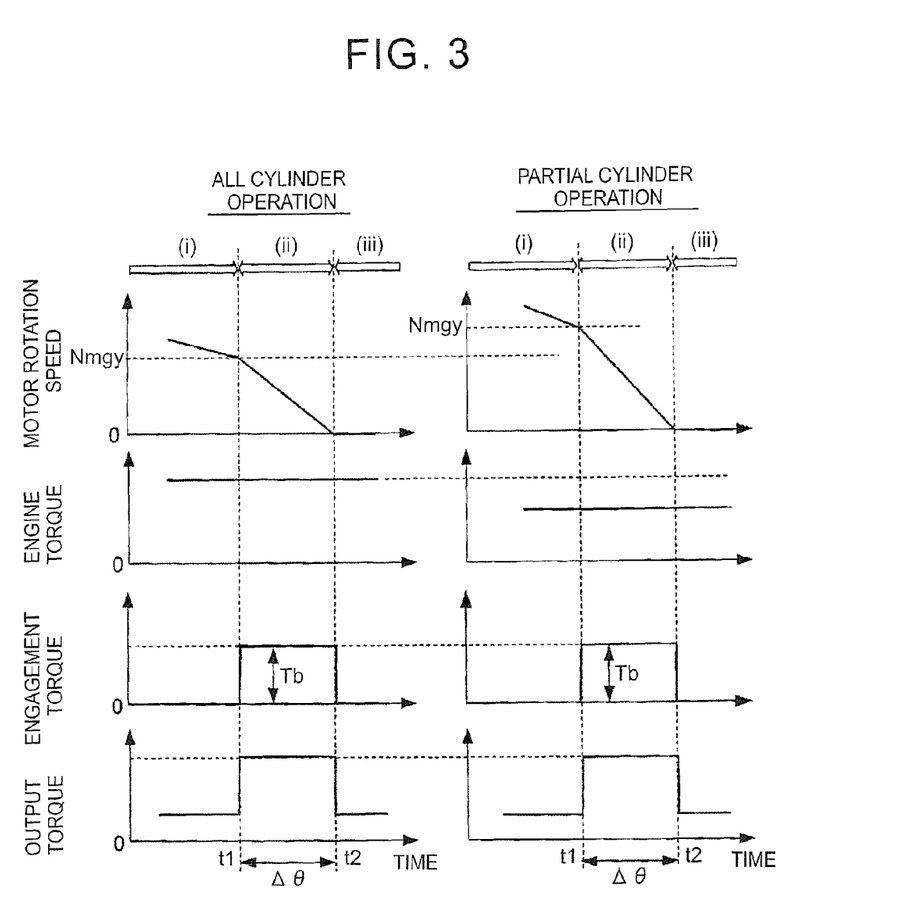
FIG. 3 is a timing chart showing an example of variation in various parameters when a locking operation is performed during the all-cylinder operation and during the partial cylinder operation, according to the first embodiment.

As shown in FIG. 3, a process for switching the motor locking mechanism from the disengaged condition to the engaged condition can be divided into three stages (i) to (iii). In stage (i), the motor rotation speed (rotation speed) of the first motor generator 4 is reduced to the operation permission rotation speed Nmgy. As is evident from FIG. 3, the operation permission rotation speed Nmgy used during the partial cylinder operation is higher than the operation permission rotation speed Nmgy used during the all-cylinder operation. When the motor rotation speed decreases to the operation permission rotation speed Nmgy, the process advances to stage (ii), where an operation to engage the motor locking mechanism 25 is started at a time t1. When the engagement operation starts, an engagement torque of the motor locking mechanism 25 rises to the engagement torque capacity Tb at the time t1 and then remains constant until a time t2 at which the engagement operation ends. Meanwhile, the engagement torque capacity Tb acts on the first motor generator 4 such that the motor rotation speed gradually decreases until reaching a rotation speed corresponding to the engaged condition, or in other words zero, at the time t2.

In stage (ii), the operation permission rotation speed Nmgy is higher in the partial cylinder operation than in the all-cylinder operation, the engine torque Te is lower in the partial cylinder operation than in the all-cylinder operation, and the operation time $\Delta\theta$ is equal in the all-cylinder operation and the partial cylinder operation. Therefore, as can also be understood from Equation 3, the engagement torque capacity Tb is equal in the all-cylinder operation and the partial cylinder operation. As a result, the output torque output to the output gear train 20 is equal in the all-cylinder operation and the partial cylinder operation. Accordingly, shock generated in the vehicle 1 can be suppressed equally during the partial cylinder operation and the all-cylinder operation while suppressing deterioration of the fuel efficiency in the partial cylinder operation. Further, the operation of the motor locking mechanism is completed in the same time $\Delta\theta$ in both the all-cylinder operation and the partial cylinder operation, and therefore the driver does not experience a sense of discomfort caused by a difference in the time $\Delta\theta$. Note that the output torque is obtained by multiplying a gear ratio from the first motor generator 4 to the output gear train 20 by the engagement torque capacity Tb.

Figure 4:
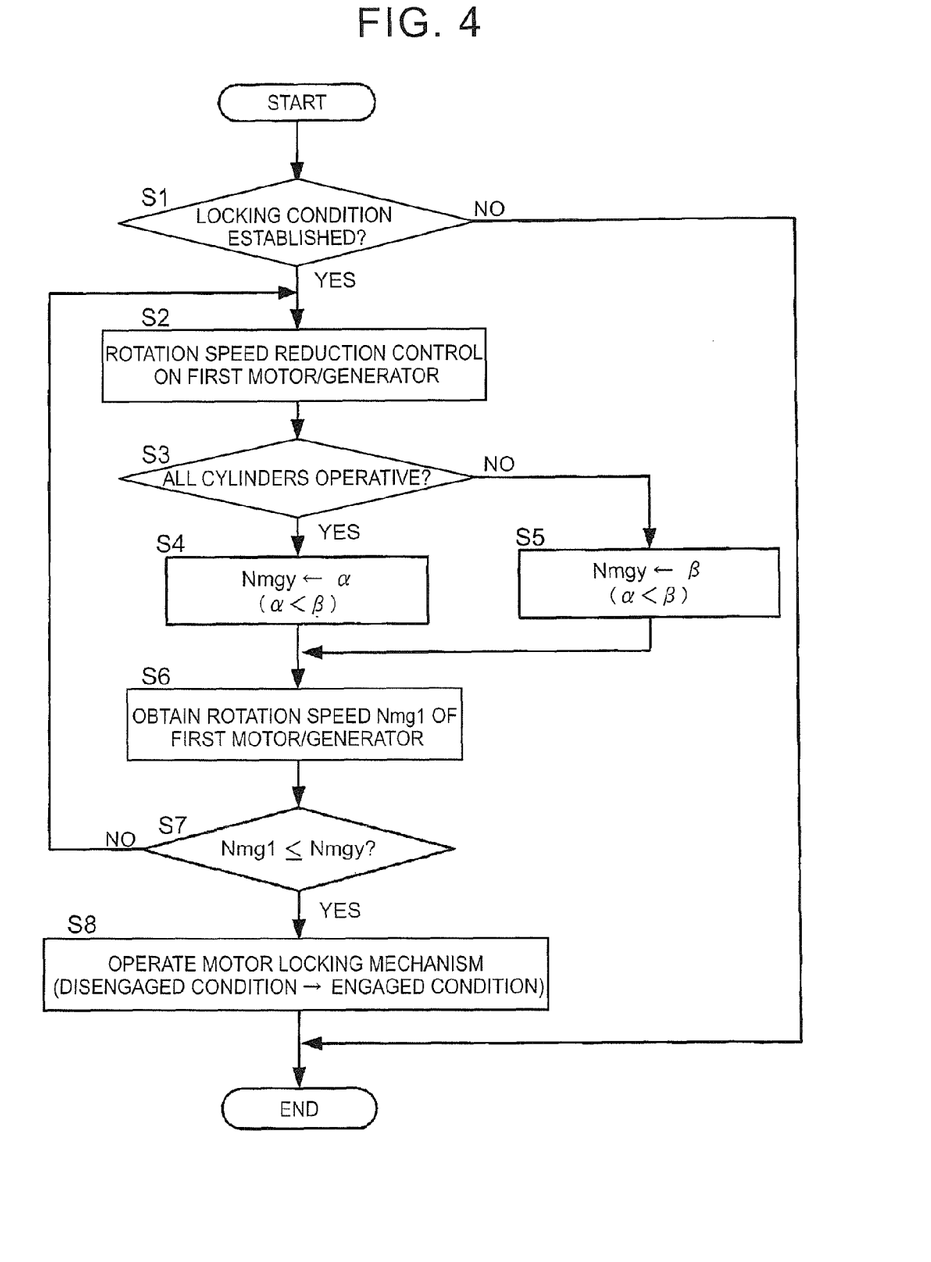
FIG. 4 is a flowchart showing an example of a control routine according to the first embodiment.

Next, referring to FIG. 4, an example of a control routine executed by the ECU 30 will be described. A program of the control routine shown in FIG. 4 is held in the ECU 30, read on a timely basis, and executed repeatedly at predetermined intervals. Note that the ECU 30 executes following basic control parallel to the control routine shown in FIG. 4. The ECU 30 sets either the all-cylinder operation or the partial cylinder operation as the operation mode of the engine 3 on the basis of the required drive torque, and then calculates the operating point of the engine 3 and the motor torque of the second motor generator 5 corresponding to the required drive torque in accordance with the determined operation mode. The ECU 30 then controls the engine 3, the first motor generator 4, and the second motor generator 5 to operate at the calculated operating point and motor torque.

As shown in FIG. 4, in step S1, the ECU 30 determines whether or not a locking condition, or in other words a condition for shifting from the differential operation mode to the non-differential operation mode by switching the motor locking mechanism 25 from the disengaged condition to the engaged condition, is established. For example, the lock condition may be set to be established when the temperature of the first motor generator 4 exceeds a threshold set to avoid overheating. When the locking condition is established, the routine advances to step S2. When the locking condition is not established, subsequent processing is skipped and the current routine is terminated in order to maintain the differential operation mode.

In step S2, the ECU 30 implements rotation speed reduction control to reduce the motor rotation speed of the first motor generator 4. An amount by which the motor rotation speed is reduced per process is set appropriately. In other words, a reduction rate of the motor rotation speed during the rotation speed reduction control is set appropriately. In step S3, the ECU 30 determines whether or not the operation mode of the engine 3 corresponds to the all-cylinder operation. When the operation mode corresponds to the all-cylinder operation, the routine advances to step S4, where the value of the operation permission rotation speed Nmgy is set at $\alpha$. When the operation mode does not correspond to the all-cylinder operation, or in other words when the operation mode corresponds to the partial cylinder operation, on the other hand, the routine advances to step S5, where the value of the operation permission rotation speed Nmgy is set at $\beta$ ($\alpha<\beta$).

In step S6, the ECU 30 obtains a rotation speed Nmg1 of the first motor generator 4. In step S7, the ECU 30 determines whether or not the rotation speed Nmg1 of the first motor generator 4 has reached the operation permission rotation speed Nmgy, or in other words whether Nmg1 and Nmgy are equal or Nmg1 is smaller than Nmgy. When the rotation speed Nmg1 of the first motor generator 4 is higher than the operation permission rotation speed Nmgy, the ECU 30 returns the processing to step S2 and continues the rotation speed reduction control. When the rotation speed Nmg1 of the first motor generator 4 has reached the operation permission rotation speed Nmgy, on the other hand, the ECU 30 advances the processing to step S8, where the operation to switch the motor locking mechanism 25 from the disengaged condition to the engaged condition is started. The current routine is then terminated.

According to the control routine shown in FIG. 4, the operation permission rotation speed Nmgy is set respectively at the small value $\alpha$ during the all-cylinder operation and the large value $\beta$ during the partial cylinder operation. Therefore, as described above, shock generated in the vehicle 1 can be suppressed equally during the partial cylinder operation and the all-cylinder operation while suppressing deterioration of the fuel efficiency in the partial cylinder operation. The ECU 30, by executing the control routine of FIG. 4, may be considered as a controller according to the invention.

Second Embodiment

Next, referring to FIG. 5, a second embodiment of the invention will be described. In the second embodiment, the time required to reach the engaged condition from the start of the operation of the motor locking mechanism is set to be shorter during the partial cylinder operation than during the all-cylinder operation. To modify the operation time, the motor locking mechanism 25 used in the second embodiment is configured such that the time required to reach the engaged condition from the disengaged condition can be modified.

In the first embodiment, when the first motor generator 4 is to be locked, the rotation speed reduction control is implemented in advance to reduce the motor rotation speed. In following cases (1) to (3) and the like, however, it may be impossible to reduce the motor rotation speed to the predetermined operation permission rotation speed.

(1) A case in which an output of the battery 16 is limited due to a reduction in an amount of power stored in the battery 16, overheating or a temperature reduction in the battery 16, and so on. (2) A case in which the output torque of the first motor generator 4 is limited due to an increased temperature in a switching element provided in the motor control apparatus 15. (3) A case in which the output torque of the first motor generator 4 is limited due to an increased temperature in the first motor generator 4.

To add to case (2), typically, when the rotation speed of a motor generator is close to zero, an amount of time during which a current is applied to switching elements having an identical phase increases. As a result, the temperature of a specific switching element tends to increase. When the first motor generator 4 is locked, the motor rotation speed is controlled to a low speed close to zero by the rotation speed reduction control, and therefore the likelihood of a switching element overheating is high.

When circumstances corresponding to cases (1) to (3) described above, for example, are present, it is effective to implement the second embodiment selectively in place of the first embodiment.

Figure 5:
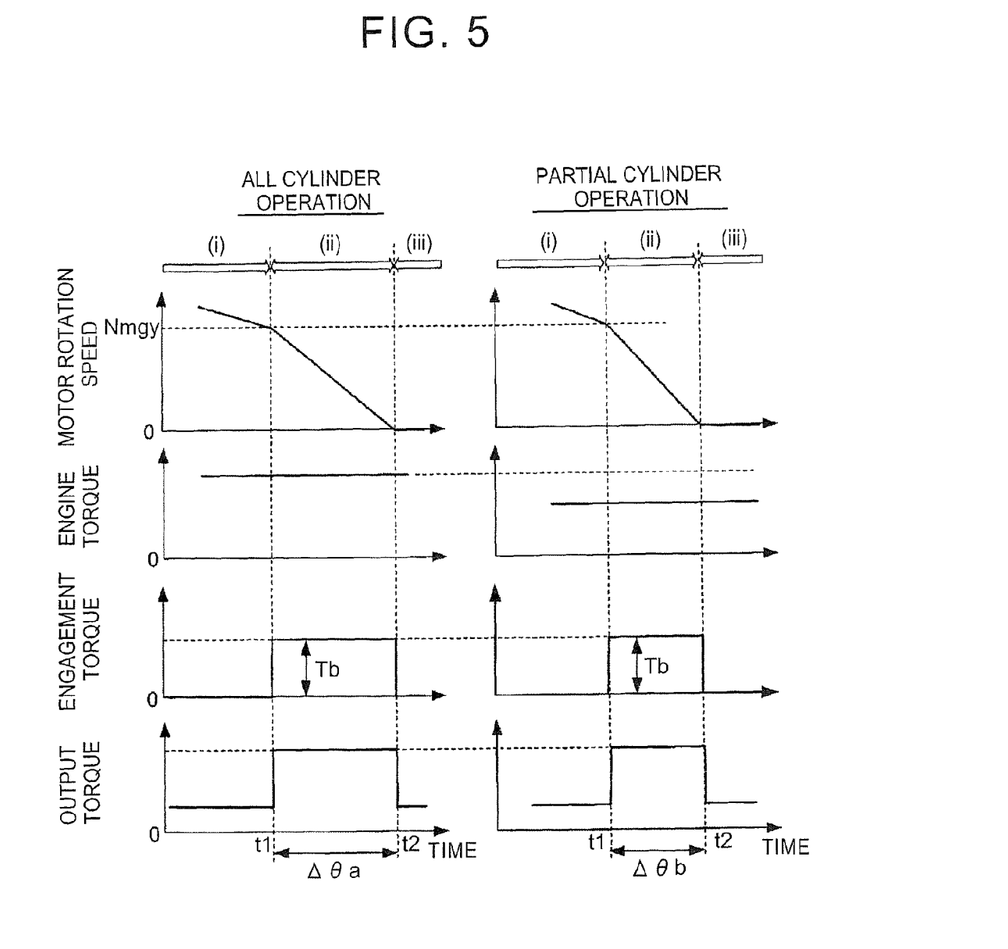
FIG. 5 is a timing chart showing an example of variation in various parameters according to a second embodiment of the invention.

As shown in FIG. 5, in the second embodiment, the operation permission rotation speed Nmgy is set at an identical value in both the all-cylinder operation and the partial cylinder operation. When the motor rotation speed reaches the operation permission rotation speed Nmgy, the ECU 30 controls the motor locking mechanism 25 such that an operation time $\Delta\theta b$ of the partial cylinder operation is shorter than an operation time $\Delta\theta a$ of the all-cylinder operation. Since the operation permission rotation speed Nmgy is equal in the all-cylinder operation and the partial cylinder operation, the rotation speed decrease rate a is higher in the partial cylinder operation than in the all-cylinder operation in stage (ii). Further, the engine torque is lower in the partial cylinder operation than in the all-cylinder operation. Accordingly, as can be understood from Equation 1, the engagement torque capacity Tb is equal in the all-cylinder operation and the partial cylinder operation. As a result, the output torque output to the output gear train 20 is equal in the all-cylinder operation and the partial cylinder operation. Hence, according to the second embodiment, similarly to the first embodiment, shock generated in the vehicle 1 can be suppressed equally during the partial cylinder operation and the all-cylinder operation while suppressing deterioration of the fuel efficiency during the partial cylinder operation.

The invention is not limited to the embodiments described above, and may be implemented in various embodiments within the scope of the invention. In the above embodiments, the second motor generator is provided in addition to the first motor generator, but provision of two motor generators is merely an example, and the invention may be applied to any hybrid vehicle having a lockable motor generator, regardless of whether or not another motor generator is provided.

In the above embodiments, the rotation speed decrease rate a of the motor rotation speed is set to be higher during the partial cylinder operation than during the all-cylinder operation by modifying one of the operation permission rotation speed Nmgy and the operation time $\Delta\theta$ in Equation 3 between the all-cylinder operation and the partial cylinder operation and making the other equal during both operations. However, as long as the rotation speed decrease rate a of the motor rotation speed is higher during the partial cylinder operation than during the all-cylinder operation, the operation permission rotation speed Nmgy and the operation time $\Delta\theta$ may both be modified.

Further, in the above embodiments, the respective parameters described above are set such that the engagement torque capacity of the motor locking mechanism is equal in the all-cylinder operation and the partial cylinder operation. However, the invention is not limited to an embodiment in which the engagement torque capacity is equal during the all-cylinder operation and the partial cylinder operation, and as long as a difference between the engagement torque capacity of the all-cylinder operation and the engagement torque capacity of the partial cylinder operation is smaller than that of a case in which the rotation speed decrease rate remains constant during the all-cylinder operation and the partial cylinder operation, the object of the invention can be achieved.

In the above embodiments, a variable displacement engine capable of executing both a partial cylinder operation and an all-cylinder operation is cited as an example of the engine to which the invention is applied. However, the invention may be applied to any engine an output torque of which varies before and after an operation mode is switched. For example, in a conventional engine in which the engine operation mode can be switched between lean combustion and stoichiometric combustion, the output torque is likewise further toward the low torque side during the lean combustion than during the stoichiometric combustion. Therefore, the lean combustion and the stoichiometric combustion may be regarded respectively as the low torque operation mode and the high torque operation mode according to the invention. Hence, an identical condition to that of the above embodiments can be set in relation to the locking apparatus in a vehicle installed with a lean burn engine instead of the variable displacement engine described in the above embodiments. More specifically, in the description of the above embodiments, "partial cylinder operation" can be read as "lean combustion", and "all-cylinder operation" can be read as "stoichiometric combustion". Accordingly, shock generated in the vehicle can be suppressed during both lean combustion and stoichiometric combustion while suppressing deterioration of the fuel efficiency during lean combustion, and therefore both shock generated in the vehicle and deterioration of the fuel efficiency can be suppressed.

What is claimed is:

1. A control apparatus for a hybrid vehicle including:
an engine in which a low torque operation mode, in which the engine is operated at a low output torque, and a high torque operation mode, in which the engine is operated at a higher output torque than in the low torque operation mode, are executed;
a motor generator;
an output portion for transmitting torque to a drive wheel;
a differential mechanism that distributes the torque of the engine to the motor generator and the output portion; and
a locking apparatus that is switched between an engaged condition, in which the motor generator is prevented from rotating, and a disengaged condition, in which the motor generator is allowed to rotate,
the control apparatus comprising:
a controller configured to reduce a rotation speed of the motor generator before the locking apparatus is switched from the disengaged condition to the engaged condition,
the controller being configured to start switching the locking apparatus to the engaged condition when the rotation speed decreases to a predetermined operation permission rotation speed,
the controller being configured to control the locking apparatus such that from the start of the switch to the engaged condition onward, the rotation speed decreases from the operation permission rotation speed to an engagement rotation speed at which the motor generator is in the engaged condition,
the controller being configured to control the locking apparatus such that a decrease rate of the rotation speed when switching from the disengaged condition to the engaged condition in the low torque operation mode is higher than a decrease rate of the rotation speed when switching from the disengaged condition to the engaged condition in the high torque operation mode,
the decrease rates being obtained by dividing the operation permission rotation speed by a time required for the rotation speed to decrease from the operation permission rotation speed to the engagement rotation speed.

2. The control apparatus according to claim 1, wherein the operation permission rotation speed when switching from the disengaged condition to the engaged condition in the low torque operation mode is set to be higher than the operation permission rotation speed when switching from the disengaged condition to the engaged condition in the high torque operation mode.

3. The control apparatus according to claim 2, wherein the controller is configured to control the locking apparatus such that the time required to switch from the disengaged condition to the engaged condition in the high torque operation mode is identical to the time required to switch from the disengaged condition to the engaged condition in the low torque operation mode.

4. The control apparatus according to claim 1, wherein the controller is configured to control the locking apparatus such that the time required to switch from the disengaged condition to the engaged condition in the low torque operation mode is shorter than the time required to switch from the disengaged condition to the engaged condition in the high torque operation mode.

5. The control apparatus according to claim 1, wherein the controller is configured to control the engine that includes a plurality of cylinders such that the engine executes a partial cylinder operation, in which a part of the plurality of cylinders is rested while remaining cylinders are operated, as the low torque operation mode and an all-cylinder operation, in which all of the plurality of cylinders are operated, as the high torque operation mode.

6. The control apparatus according to claim 1, wherein the controller is configured to switch an operation mode of the engine between stoichiometric combustion and lean combustion, and configured to execute the lean combustion as the low torque operation mode and the stoichiometric combustion as the high torque operation mode.

7. A method of controlling a hybrid vehicle including:
an engine in which a low torque operation mode, in which the engine is operated at a low output torque, and a high torque operation mode, in which the engine is operated at a higher output torque than in the low torque operation mode, are executed;
a motor generator;
an output portion for transmitting torque to a drive wheel;
a differential mechanism that distributes the torque of the engine to the motor generator and the output portion; and
a locking apparatus that is switched between an engaged condition, in which the motor generator is prevented from rotating, and a disengaged condition, in which the motor generator is allowed to rotate,
the control method comprising:
reducing a rotation speed of the motor generator before the locking apparatus is switched from the disengaged condition to the engaged condition;
starting to switch the locking apparatus to the engaged condition when the rotation speed decreases to a predetermined operation permission rotation speed;
controlling the locking apparatus such that from the start of the switch to the engaged condition onward, the rotation speed decreases from the operation permission rotation speed to an engagement rotation speed at which the motor generator is in the engaged condition; and
controlling the locking apparatus such that a decrease rate of the rotation speed when switching from the disengaged condition to the engaged condition in the low torque operation mode is higher than a decrease rate of the rotation speed when switching from the disengaged condition to the engaged condition in the high torque operation mode,
the decrease rates being obtained by dividing the operation permission rotation speed by a time required for the rotation speed to decrease from the operation permission rotation speed to the engagement rotation speed.

* * * * *